United States Patent [19]

Stout et al.

[11] 4,411,093
[45] Oct. 25, 1983

[54] INSECT LURE

[75] Inventors: Daniel M. Stout, Kirkwood, Mo.; Charles B. Duff, Scottsdale, Ariz.

[73] Assignee: Whitmire Research Laboratories, Inc., Kirkwood, Mo.

[21] Appl. No.: 274,551

[22] Filed: Jun. 17, 1981

[51] Int. Cl.³ .............................................. A01M 1/14
[52] U.S. Cl. ...................................................... 43/114
[58] Field of Search ................. 43/114, 115, 116, 117; 424/77, 83, 84

[56] References Cited

U.S. PATENT DOCUMENTS

| | | | |
|---|---|---|---|
| 511,689 | 12/1893 | Dodd | 43/115 |
| 537,060 | 4/1895 | Mitchamore | 43/114 |
| 628,494 | 7/1899 | Schrlever | 43/115 |
| 751,970 | 2/1904 | Zierl | 43/114 |
| 3,029,188 | 4/1962 | Cyr | 424/83 |
| 3,653,145 | 4/1972 | Stout | 43/131 |
| 3,755,958 | 9/1973 | Bradshaw | 43/114 |
| 3,913,259 | 10/1975 | Nishimura et al. | 43/114 |

Primary Examiner—Nicholas P. Godici
Assistant Examiner—Kurt Rowan
Attorney, Agent, or Firm—Paul M. Denk

[57] ABSTRACT

In an insect lure for attracting and killing insects, particularly the housefly, a tubular formed base member incorporates a pair of end caps, at each end of the tube, with the tubular member being formed of a kraft base paper, wrapped with an outer layer of white paper, then being covered with a fluorescent paper that provides a superficial luminescent surface of attraction to such insects, said luminescent material is overprinted with silhouettes of insects, such as the housefly, usually in a clustered arrangement, and may have a poison located at the focal point of such cluster for enhancing the kill of any attracted insect, and, finally, a coating of a lacquer is applied over the fluorescent attractant, including any silhouettes imprinted thereon, and a highly viscous tackifier material is applied upon the lacquer barrier for enhancing insect adherence thereto. The process of attracting such insects, particularly the housefly, is encompassed in this invention and which comprises the formation of the previously identified type tubular base member, having its ends capped, and positioning such graphic silhouettes of flies upon a luminescent background coating with the then application of a lacquer, and then applying the highly viscous tackifier material to its surface.

22 Claims, 6 Drawing Figures

INSECT LURE

BACKGROUND OF THE INVENTION

This invention contemplates the formation of a lure for attracting, adhering, and killing of insects, and particularly the pesky housefly (musca domestica), and more specifically comprising a combination of component materials that attract houseflies to the lure through the usage of insect silhouettes imprinted or applied upon a luminescent background material, and a highly viscous tackifier that envelopes the surface of the lure for adhering any insect attracted to its proximity.

A great variety of lures for attracting and killing insects are available in the art. For example, in the U.S. patent earlier obtained by one of the inventors herein, Daniel Stout, U.S. Pat. No. 3,653,145, the art of controlling houseflies was generally depicted through the use of a strip containing pictorial illustrations of clusters of flies formed upon a luminescent coating, and which strip carries a toxin of which the houseflies partake once attracted to its vicinity. The research that went into that particular disclosed invention, and the test results deriving from the experimentation with that type of insect luring strip tended to prove that insects, such as the housefly, do visually observe light spectrums slightly differing from that of the human eye, and are attracted when particular luminescent materials are coated upon such formed strips. And, by imprinting silhouettes of houseflies upon such strips, the glow of the silhouettes enhanced particularly when viewed under black light, the vision which is believed to be quite dominant in the sight of the housefly, with such silhouettes prominently standing out as an attractant to any such insects within the viewing area.

Related type insect luring means are also shown in the early U.S. patent to Weismann, U.S. Pat. No. 2,956,366, in addition to the French Pat. No. 1,511,316.

Other U.S. patents that disclose various types of insect repellents, pesticides, insecticides, and insect combating devices, are shown in the various prior U.S. patents to Bordenca, et al., U.S. Pat. No. 3,767,765, the U.S. patent to Kobayashi, et al., U.S. Pat. No. 3,972,993, and in the U.S. patent to Grenberg, U.S. Pat. No. 3,996,348. In addition, various other insecticidal devices are shown in the prior U.S. patent to Hennart, et al., U.S. Pat. No. 3,781,428, and U.S. Pat. No. 4,027,420, that issued to McKibben, et al. A pesticide and a process for its manufacture is shown in the earlier patent to Rauscher, U.S. Pat. No. 3,719,751. Many of these prior art U.S. patents are within the same class and field of invention as this current development.

This current invention, on the other hand, is designed to provide as its main objective a comprehensive insect lure that includes a combination development that can function to deliver the kill to insects, and particularly the housefly, through the association of an attractant, for bringing the insect into proximity of the lure; a holding means, in the nature of a tackifier that can adhere the once landed insect to the lure, and then if needed, a toxin that can deliver a quick kill to any such adhered insect unless the insect dies from suffocation or other form of poisoning due to its fixation in place upon the tacky and adhering surface of the formed lure.

A further object of this invention is to provide an insect lure construction wherein a tubular member is capped at both ends to furnish clearance for the lure during its transit and usage, and thereby prevent and reduce any accidental touching of its highly tacky surface, but in addition, to provide a collection well at least at the bottom end of the formed lure for reception of any insect debris or parts falling from the same.

A further object of this invention is to provide means for furnishing a visual observance to the housefly of a highly and selective attractant within its visionary range of sight and focus such vision upon the luminescent type silhouettes of an imprinted insect to bring it into proximity with either the toxin and/or tackifier that can adhere and eventually achieve the demise of any adhered insect.

Still another object of this invention is to provide a compact insect lure that contains its own slidably contained hanger that slides into compactness during non-use and transit, but which can be elongated for greater utility for attaining the suspension of the lure in a highly insect accessible area where its greatest effectiveness will be attained.

Still another object of this invention is to disclose means for formation of the structural components of the base portion of an insect lure wherein various layers of paper and fluorescent material are over laid with lacquer and a gluey substance material for enhancing the multiple effectiveness of a lure of this formation.

Yet another object of this invention is to furnish an insect lure containing a variety of chemical agents that furnish both the means for adhering the landed insect to the lure surface, and attain its suffocation and/or poisoning through its contact.

Still another object of this invention is to provide a tacky surface for an insect lure but yet which is reasonably transparent so as not to detract from the attraction furnished by the underlying luminescent surface of the tubular member forming the structural base of this device.

Still another object of this invention is to provide an insect lure that can be quickly and facilely assembled during standard manufacturing and assembly line processing.

These and other objects will become more apparent to those skilled in the art upon reviewing the summary of this invention, and upon undertaking a study of the description of its preferred embodiment in view of the drawings.

SUMMARY OF THE INVENTION

This invention contemplates the formation of a particular style of fly lure that combines various of the operational components of lures available in the prior art, but formed into a new structure that enhances the practical application of a lure of this design. More specifically, the lure attaches its structural means in the form of a tubular shaped base member with particularly formed end caps attaching to each of its ends. Each end cap is formed of a pair of concentric sleeves, integrally formed extending from the end cap base, with the inner concentric sleeve being formed of a diameter to provide for its snug and rigid adherence onto an end of the tubular base member of the lure. The outer sleeve is arranged axially aligned with the tubular base member, but arranged outwardly thereof, by a diameter somewhat greater than the diameter of the tubular member, and thereby forms a well intermediate its inner surface and the inner concentric sleeve as previously defined. Thus, this greater diameter to the outer sleeve of each end cap of the tubular base member functions for at least two purposes, one to provide a spacer that prevents the tubular member, and more specifically its tackified material contained thereon, from contacting either the container in which the lure is shipped and marketed and secondly the wells formed in each end cap and particularly the bottom cap, can function to collect any insect debris falling from the lure during its usage.

Hanger means are formed in conjunction with one of the end caps, particularly its upper end cap, to facilitate the support of the lure in suspension during application.

The tubular base member of the lure is generally formed from a series of paper coatings, with certain coatings being impervious to moisture and color bleeding or transmission, while another layer of the paper is fluorescent in texture, to add to the attraction of the lure during its usage. The specific structural makeup of the tubular base member will be subsequently described. But, upon the surface of the wound paper tube is an application of a lacquer coating, of the type that when it hardens or sets adds a protective coating to the attractants applied upon the surface of the tubular member, and acts as a barrier for supporting the highly vicous tackifier material that is finally applied to the exterior surface of said lure. Lacquers of this type are generally identified in the market as comprising epoxy or acrylic coatings, and generally can be acquired from companies such as Acme Printing Inc. of Kansas City, Kans. under the tradename UV.

The viscous tackifier material applied to the surface of the lure, and more specifically to the surface of the tubular base member of said lure, may be any of the variety of tacky and sticky type of compositions that remain significantly viscous under a wide temperature range, and can readily adhere any element, such as the housefly or other insect, to it instantaneously upon even the slightest of contact. There are a great variety of these type of compositions available upon the market, but that particular compound that has been found most effective for this purpose are of the polybutene type. The basic glues or adhesive formulations suitable for surface coating to the lure or cap of this invention and can be made from many types of chemical compounds, but of the following formulations, particularly the polybutene type have been found quite successful when used in conjunction with an insect lure of this construction. Many of the identified compounds can be used singularly or in combination. They may be of the hot melt type, water base, or the solvent base (cold-type) and all formulations are of the pressure sensitive adhesive type formulations. The quick stick adhesion properties dictate just how tacky the glue is, and likewise, how it can trap the insects and hold them fast upon the slightest contact.

The particular formulations found useful for the preferred embodiment, or the best mode of this invention, are as follows, and the ingredients are defined as a percentage of their weight in the composition.

| Formula 1 | |
|---|---|
| Polyethylene | 5% |
| Polybutene 100 | 95% |
| | 100% |
| Formula 2 | |
| Polybutene 300 | 96% |
| Polyethylene | 4% |
| | 100% |
| Formula 3 | |
| Polybutene 100 | 47.5% |
| Polybutene 300 | 47.5% |
| Polyethylene | 5.0% |
| | 100.0% |
| Formula 4 | |
| Polybutene 300 | 47% |
| Mineral Oil | 47% |
| Polyethylene | 6% |
| | 100% |
| Formula 5 | |
| Abalyn | 92% |
| Polyethylene | 5% |
| Paloja | 3% |
| | 100% |
| Formula 6 | |
| Abalyn | 92% |
| Polyethylene | 8% |
| | 100% |
| Formula 7 | |
| Abalyn | 86% |
| Paloja | 14% |
| | 100% |
| Formula 8 | |
| Rosin | 33% |
| Mineral Oil | 40% |
| Paloja | 27% |
| | 100% |
| Formula 9 | |
| Abalyn | 25.4% |
| Rosin | 25.4% |
| Mineral Oil | 34.5% |
| Polyethylene | 9.2% |
| Lecithin | 1.8% |
| Latex | 3.7% |
| | 100.0% |
| Formula 10 | |
| Abalyn | 83% |
| Thixcin | 17% |
| | 100% |
| Formula 11 | |
| Abalyn | 83% |
| Bentone | 17% |
| | 100% |
| Formula 12 | |
| Abalyn | 86% |
| Estersil | 14% |
| | 100% |
| Formula 13 | |
| Castor Oil | 66% |
| Rosin | 14% |
| Thixcin | 17% |
| Latex | 3% |
| | 100% |
| Formula 14 | |
| Rosin | 45% |
| Mineral Oil | 40% |
| Paloja | 15% |
| | 100% |

All of the above defined materials can be used as a tackifier (sticky glue) on the lure body or tubular member of the insect trap. Generally, the higher viscosity for the material will have a tendency to hold larger insects and be more heat stable, however, insects of the normal size can be stuck and adhered to the lure by any one of the identified materials. Other combinations for these materials are inherently possible, and all of the formulas set forth above could be made with the inclusion of one of the polybutenes.

| Polybutene Formulations | | | |
|---|---|---|---|
| Polybutenes | | | |
| No. | % | Viscosity, D.S. @ 38° C. | @ 99° C. |
| H-1900 | 100 | | 4069–4382 |
| H-1500 | 100 | | 3026–3381 |
| H-300 | 100 | | 635–690 |
| H-100 | 100 | | 196–233 |
| H-50 | 100 | | 109–125 |
| H-35 | 100 | | 74–79 |
| H-25 | 100 | | 48–56 |
| L-100 | 100 | 210–227 | |
| L-50 | 100 | 106–112 | |
| L-14 | 100 | 27–33 | |

The above chart indicates the viscosity for particular of the identified polybutenes, showing the concentration of polybutene being at the one hundred percent level, and with the viscosity defined at approximately ambient temperature, 38° C., for particular of the shown butenes, while the other viscosities are set forth at temperatures approximating the boiling point. Polybutenes of these types can be obtained from the Chevron Chemical Company, its petrochemicals division, in San Francisco, Calif., and such polybutenes are essentially derived from polyisobutenes with each polybutene molecule containing one double bond in either the alpha or beta position. Usage of these polybutenes is quite prevalent, even in insecticides, because of the ease of its emulsification with other compounds, being highly moisture resistant, and provides excellent adhesion to anything coming into contact with it. In addition phosphorescent pigments can be added to any of these glues at a rate of 0.5% to 1.0%. These pigments will further enhance the optical attraction to the lure. Essentially, polybutenes use relies principally upon its physical rather than its chemical property, through its efforts of physically immobilizing the pest upon its contact. Such polybutenes are available from many other sources, in the emulsion form, and is also available from a source such as AMOCO Chemicals Corporations, of Chicago, Ill.

Some of the other substances included within the formulations listed above are Paloja, which is a tradename for a chicle-based gum, available from the L. A. Dreyfus Company of South Plainfield, N.J. Abalyn includes a viscous liquid, derived from rosin, which is nondrying and nontoxic, and is available from Hercules Powder Company of Wilmington, Del.

Another of the ingredients contained within the formulations include thixcin, which is a white paste derived from castor oil, is a jellant, and can be obtained from the Baker Castor Oil Company, of New York, N.Y. Bentone is a powder which is derived as a reaction product between bentonite clay and certain organic based materials, and is also a jellant, and can be obtained from the National Lead Company, of New York, N.Y. Finally, estersil is a special silica-organic jellant, and can be acquired from DuPont of Wilmington, Del.

Usage of the lure of this invention can be made in the great variety of areas where it is desirable to attract insects to a particular location, and then eliminate them from the environment. For example, in domestic animal production, such as in poultry hatcheries, or in the dairy, beef, or hog feed lots, a lure of this type is highly desirable. In the specialized animal areas, such as at veterinary hospitals, pet shops, animal kennels, or the like, and even at the zoos, a lure of this type is desirable. At commercial food manufacturing plants, or in public or commercial areas such as hotels, motels, restaurants, or the like, a lure of this type is highly desirable. What makes this lure even more attractive, particularly for use in the residential area, is that it may function without the use of any specific insecticide. For example, the fluorescent background and silhouettes of insects are highly attractive to the housefly and other insects, and once the fly lands upon the lure, it is fastened thereby by means of the highly viscous tackifier. At this point, the insect can be generally poisoned, such as through suffocation, or the like, to achieve its termination. Or as previously briefly alluded to, a toxin may also be applied to the lure, at the vicinity of the silhouettes of the clustered flies, so that ingestion and quick kill can also be accomplished. But, poisoning can occur through many means, and not just through the ingestation of a toxin, as for example, any substance which, when ingested, inhaled or absorbed, such as even the tackifier surface of this particular inventive lure, may cause damage and destruction to the body function of any insect to attain its demise.

In addition, and through experimentation and testing, observations have been made through field test that the housefly can be lured to luminescent material with graphic silhouettes resembling houseflies produced by techniques other than printing, as previously explained. This fact can even be observed through a review of a bait trap which has triangular holes cut through its walls, and which when apparently observed by the housefly, in its visual spectrum of sight, undertakes a rather luminescent appearance leading to the attraction of this insect to the lure. In fact, many differently designed punched holes applied to the lure, and not just of the triangular shape, has the tendency to function as the attractant to the housefly, but the imprinted silhouette of a housefly has appeared to provide the most attraction to this insect. The hypothesis made from these field tests and observations is that optically insects can be attracted to a lure containing various silhouettes either when imprinted, or punched thereon, and contained upon a luminescent or ultra-violet background and particularly when the silhouettes simulate the appearance of the specie. Some of this information has already been analyzed within the previously identified U.S. patent of one of the inventors herein, disclosing his invention upon the art of controlling houseflies.

Even so, having some knowledge that the insect has visual discrimination in the ultra-violet range below that of the human eye, usage of such type of an attractant upon a lure of the type disclosed in this invention can be an advantageous advancement in this art. Pictorial illustrations upon fly lures were tested in the dark room, and examined under ultra-violet light. To the human eyes all printed flies appeared true black silhouettes. Those traps in which were made the punched hole type of silhouettes were examined and compared with the printed pictorial illustrated fly lures. And, from a distance it was impossible to discriminate the printed silhouettes from the punched silhouettes. It was concluded that the insect apparently cannot distinguish the difference and is equally attracted to both types of attractants. It is believed that this observation may be a new approach to better understanding insect visual acuity, or a method to better understanding of what insects can see in the ultra-violet range which is beyond the human capacity in the light spectrum.

A study was made on silhouette techniques or methods to produce the effect under ultra-violet light with the assumption that the insect could be equally lured to any lure as long as it approximated the type of lure shown in the earlier U.S. Pat. No. 3,653,145, particularly as viewed by humans in the absence of visual and infra-red light. The systems derived, and which produce the same visual effects, were as follows:
- A. A hole punched or die cut through luminescent paper stock, (visually, the hole goes to infinity) which is biologically representative of a fly.
- B. A hole punched or die cut through luminescent paper stock with its backside laminated with black paper which will totally absorb all ultra-violet light which is biologically representative of a fly.
- C. Biologically representative die cut fly from black paper secured to a luminescent paper stock.
- D. Printed biologically representative black fly convex pressed on luminescent paper stock.
- E. Printed biologically representative black fly concave pressed on luminescent paper.
- F. Embossed biologically representative black fly on luminescent paper stock.
- G. Actual dead flies glued onto luminescent paper stock.
- H. Printed silhouettes of the fly on a fluorescent background and having an intervening margin surrounding the silhouettes.
- I. The printed biologically representative black fly upon paper stock.
- J. The combination of techniques A. through I. on luminescent paper stock.

All of these types of silhouette forms of attractants imprinted are structured into the tubular base member of this particular lure have been found to be highly attractive to particularly the housefly, and while most tests have been conducted principally upon the housefly, there is reason to believe that such attractants also work equally as well upon the other types of insects that generally exist in and share our environment.

DESCRIPTION OF THE PREFERRED EMBODIMENT

Figure 1:
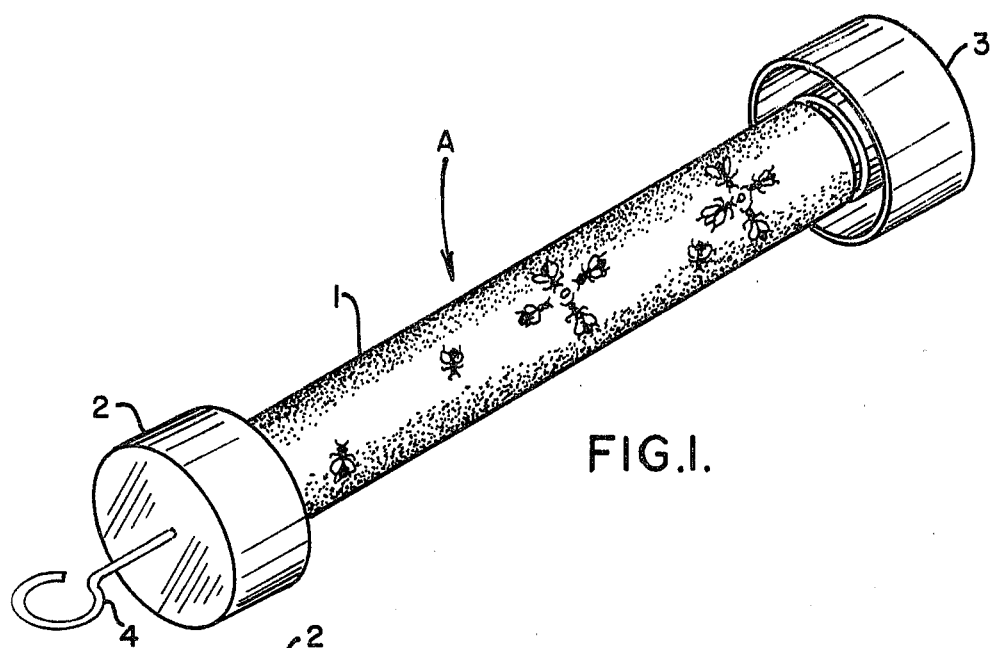
FIG. 1 provides an isometric view of the insect lure of this invention.
Figure 2:
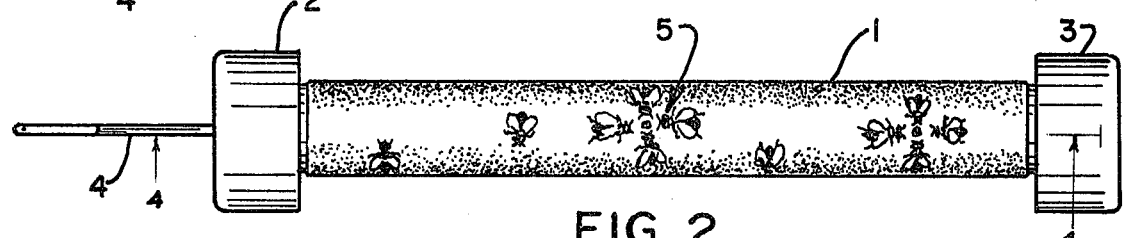
FIG. 2 provides a side view of the insect lure shown in FIG. 1.
Figure 3:
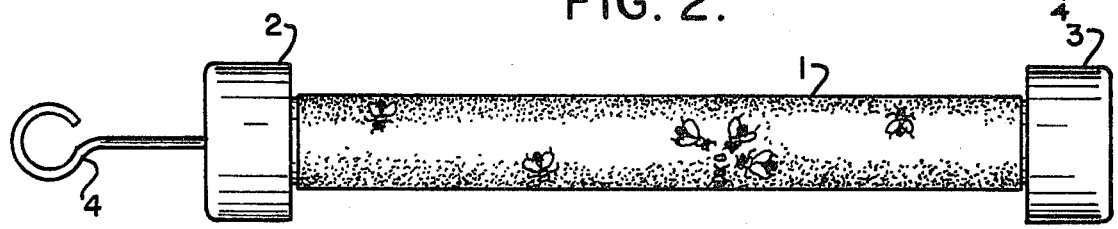
FIG. 3 provides another side view, at a quarter turn, of the insect lure shown in FIG. 2.

In referring to the drawings, and in particular FIGS. 1 through 3, there is disclosed the insect lure A of this Invention, comprising a tubular member 1, of some length, and having end caps 2 and 3 applied to each of its ends. Extending from the upper end cap 2 is a hanger 4, containing the usual hook, and which facilitates the suspension of this lure from any accessible location.

The tubular member 1 contains a series of imprinted or clustered silhouettes of, in this particular instance, the housefly thereon, as at 5, and their particular silhouettes can be obtained by the usual printing method, as previously explained, but such silhouettes can also be punched, embossed, applied by gluing, or generally and structurally applied to the surface of the tubular member in any of a variety of ways as previously described in the summary explaining the effectiveness as an attractant of this lure concept. And, these silhouettes can be, as previously explained, either punched triangular designs, holes, or any of a variety of designs that approximate the size of the insect desired to be lured to this device, such as the housefly, as shown.

Figure 4:
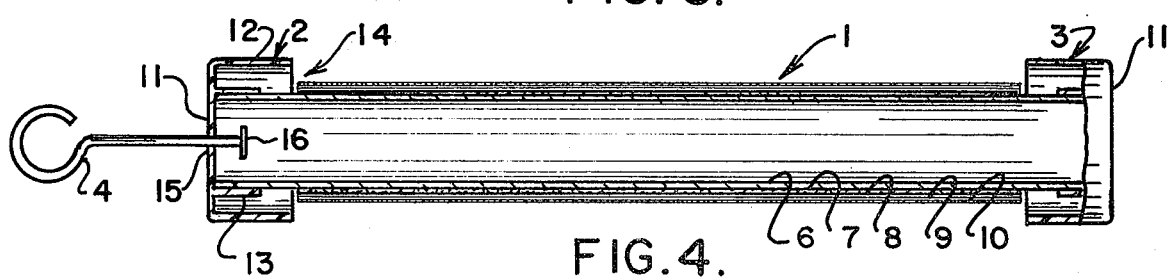
FIG. 4 provides a substantial transverse cross-sectional view taken through the lure shown in FIG. 2.
Figure 5:
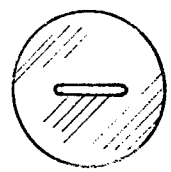
FIG. 5 provides a top view of the lure shown in FIG. 3.
Figure 6:
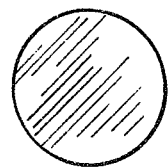
FIG. 6 provides a bottom view of the lure shown in FIG. 3.

In referring to FIG. 4, it can be seen that the tubular member is basically formed of a convolutely or spirally wound kraft base paper, as at 6, and then includes a layer of white or light shade paper wound around the base kraft 2, and for the purpose of preventing any brown or other color bleed through to the surface of the tube. This white paper layer is disclosed at 7. Then, a layer of fluorescent paper which functions as luminescent material is applied over the surface of the white paper, as at 8, and functions as a long distance attractant to the insect. A coating of lacquer 9 is applied over the fluorescent paper, and is designed to provide protection to the underlying layers of paper, so that neither the gummy or tackifier substance can bleed through to the fluorescent pigment, and nor will the elements attain access to the same, which would otherwise lead toward its early distruction. Following this, an outer coating of the highly viscous tackifier or gummy material is applied to the surface of the tube, of the type as previously identified, but essentially such gummy material can be used which attains its desired tacky viscosity for long periods of time, and can maintain its quick stick adhesion to any element, and particularly the insect, brought into contact with the lure. The polybutenes as previously described have been found most effective.

Each end cap for this lure, as previously explained, includes a base 11, having integrally formed and extending from it a pair of concentric sleeves 12 and 13, with the inner sleeve 13 having a dimension only slightly larger than the diameter of the finished tubular member 1, so that the tubular member can be slid into, or over, said inner sleeve and be firmly adhered to it, either by friction, or perhaps by the application of an adhesive. The outer concentric sleeve 12 functions for the two fold purposes as previously explained, as a spacer, to prevent contact with the tacky tubular member during transit or storage, and likewise, contains the well 14 therein, between the interior surface of the outer sleeve 12, and the inner sleeve 13, and into which any residue or debris from the trapped insects may fall into during usage.

The hanger means 4 as previously explained contains its hook portion for suspension purposes, with the opposite end of the hanger being inserted through an aperture, as at 15, formed through the upper end cap 2, with the inner end of the hanger having a head means 16 provided thereon. so as to prevent the release of the hanger from the lure.

Variations and modifications to the lure of this invention may occur to those skilled in the art upon reviewing the subject matter of this invention. Such variations, or modifications, if within the spirit of this invention, are intended to be encompassed within the scope of any claims to patent protection issued upon the same. The description of the preferred embodiment set forth herein is done so for illustrative purposes only, and is not intended as a limitation upon the scope of this invention.

Having thus described the invention what is claimed and desired to be secured by Letters Patent is:

1. An insect lure for use in both attracting the insect to the lure from a distance and then terminating the life of the same after its adherence to the lure, comprising, a base member incorporating both the means for attracting and killing the insect, said base member having a superficial fluorescent attractant of luminescent material overprinted with silhouettes of insects for enhancing attraction of such insects to the lure, a coating of a highly viscous tackifier material for adhering the lure settled insect until its demise, said lure including a tubular base member, said tubular base member being formed as a wound tube, a light shade layer of paper applied over the base member to prevent the tube from color bleed therethrough, a wound layer of fluorescent paper forming the luminescent material applied over the light shade of paper, a coating of lacquer applied over the luminescent paper to function as tube barrier, and said tackifier coating being applied upon the lacquer barrier for enhancing insect adherence.

2. The invention of claim 1 and including a nonluminescent margin intervening said luminescent material and the printed silhouettes of the insects.

3. The invention of claim 1 and wherein the silhouettes of insects include flies whereby the lure constitutes a fly lure.

4. The invention of claim 1 and including end caps provided at both ends of the tubular base member, said caps provided for functioning as spacers to prevent unwanted contact with the tacky material coating during shipment and usage.

5. The invention of claim 5 and wherein each end cap includes a base, a pair of concentric sleeves integrally formed upon said base, the inner sleeve disposed for tightly adhering onto the adjacent tube base member end, and a well formed within the intermediate space between the concentric sleeves and disposed for collecting any insect debris falling from the insect lure.

6. The invention of claim 1 and wherein said viscous tackifier material includes polybutene.

7. The invention of claim 1 and wherein said viscous tackifier material includes the following ingredients in percentage by weight

| | |
|---|---|
| Polyethylene | 5% |
| Polybutene 100 | 95% |
| | 100% | whereby any insect settling on the lure will be substantially permanently adhered thereto at least until its demise.

8. The invention of claim 1 and wherein said viscous tackifier material includes the following ingredients in percentage by weight

| | |
|---|---|
| Polybutene 300 | 96% |
| Polyethylene | 4% |
| | 100% | whereby any insect settling on the lure will be substantially permanently adhered thereto at least until its demise.

9. The invention of claim 1 and wherein said viscous tackifier material includes the following ingredients in percentage by weight

| | |
|---|---|
| Polybutene 100 | 47.5% |
| Polybutene 300 | 47.5% |
| Polyethylene | 5.0% |
| | 100.0% | whereby any insect settling on the lure will be substantially permanently adhered thereto at least until its demise.

10. The invention of claim 1 and wherein said viscous tackifier material includes the following ingredients in percentage by weight

| | |
|---|---|
| Polybutene 300 | 47% |
| Mineral Oil | 47% |
| Polyethylene | 6% |
| | 100% | whereby any insect settling on the lure will be substantially permanently adhered thereto at least until its demise.

11. The invention of claim 1 and wherein said viscous tackifier material includes the following ingredients in percentage by weight

| | |
|---|---|
| Abalyn | 92% |
| Polyethylene | 5% |
| Paloja | 3% |
| | 100% | whereby any insect settling on the lure will be substantially permanently adhered thereto at least until its demise.

12. The invention of claim 1 and wherein said viscous tackifier material includes the following ingredients in percentage by weight

| | |
|---|---|
| Abalyn | 92% |
| Polyethylene | 8% |
| | 100% | whereby any insect settling on the lure will be substantially permanently adhered thereto at least until its demise.

13. The invention of claim 1 and wherein said viscous tackifier material includes the following ingredients in percentage by weight

| | |
|---|---|
| Abalyn | 86% |
| Paloja | 14% |
| | 100% | whereby any insect settling on the lure will be substantially permanently adhered thereto at least until its demise.

14. The invention of claim 1 and wherein said viscous tackifier material includes the following ingredients in percentage by weight

| | |
|---|---|
| Rosin | 33% |
| Mineral Oil | 40% |
| Paloja | 27% |
| | 100% | whereby any insect settling on the lure will be substantially permanently adhered thereto at least until its demise.

15. The invention of claim 1 and wherein said viscous tackifier material includes the following ingredients in percentage by weight

|  |  |
|---|---|
| Abalyn | 25.4% |
| Rosin | 25.4% |
| Mineral Oil | 34.5% |
| Polyethylene | 9.2% |
| Lecithin | 1.8% |
| Latex | 3.7% |
|  | 100.0% | whereby any insect settling on the lure will be substantially permanently adhered there at least until its demise.

16. The invention of claim 1 and wherein said viscous tackifier material includes the following ingredients in percentage by weight

|  |  |
|---|---|
| Abalyn | 83% |
| Thixcin | 17% |
|  | 100% | whereby any insect settling on the lure will be substantially permanently adhered thereto at least until its demise.

17. The invention of claim 1 and wherein said viscous tackifier material includes the following ingredients in percentage by weight

|  |  |
|---|---|
| Abalyn | 83% |
| Bentone | 17% |
|  | 100% | whereby any insect settling on the lure will be substantially permanently adhered thereto at least until its demise.

18. The invention of claim 1 and wherein said viscous tackifier material includes the following ingredients in percentage by weight

|  |  |
|---|---|
| Abalyn | 86% |
| Estersil | 14% |
|  | 100% | whereby any insect settling on the lure will be substantially permanently adhered thereto at least until its demise.

19. The invention of claim 1 and wherein said viscous tackifier material includes the following ingredients in percentage by weight

|  |  |
|---|---|
| Castor Oil | 66% |
| Rosin | 14% |
| Thixcin | 17% |
| Latex | 3% |
|  | 100% | whereby any insect settling on the lure will be substantially permanently adhered thereto at least until its demise.

20. The invention of claim 1 and wherein said viscous tackifier material includes the following ingredients in percentage by weight

|  |  |
|---|---|
| Rosin | 45% |
| Mineral Oil | 40% |
| Paloja | 15% |
|  | 100% | whereby any insect settling on the lure will be substantially permanently adhered thereto at least until its demise.

21. The invention of claim 1 and wherein said insect lure includes the silhouette of a cluster of flies, and a poison positioned at the focal point of said cluster which upon consumption accelerates the killing of any settled insect.

22. The invention of claim 4 and including hanger means useful for suspending the lure, said hanger means including a shank portion for extending through one end cap, means integrally provided upon the cap inserting portion of shank for retaining the same therein, said shank portion also including a hook at its other end and being useful for suspending the insect lure during usage.

* * * * *